US009040139B2

(12) United States Patent
Watanabe et al.

(10) Patent No.: US 9,040,139 B2
(45) Date of Patent: *May 26, 2015

(54) DISK AND PROCESS FOR PRODUCING BASE MATERIAL FOR DISK, AND DISK ROLL

(71) Applicant: NICHIAS CORPORATION, Tokyo (JP)

(72) Inventors: Kazuhisa Watanabe, Tokyo (JP); Kouji Iwata, Tokyo (JP); Masaaki Nakayama, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,766

(22) Filed: Feb. 27, 2014

(65) Prior Publication Data

US 2014/0173901 A1    Jun. 26, 2014

Related U.S. Application Data

(63) Continuation of application No. 13/111,116, filed on May 19, 2011, now Pat. No. 8,691,356.

(30) Foreign Application Priority Data

May 19, 2010    (JP) ................ P.2010-115460

(51) Int. Cl.
*B32B 1/04*    (2006.01)
*B05C 1/08*    (2006.01)
(Continued)

(52) U.S. Cl.
CPC ............... *B65H 27/00* (2013.01); *C04B 28/24* (2013.01); *C04B 33/36* (2013.01); *C04B 35/117* (2013.01);
(Continued)

(58) Field of Classification Search
CPC ............... C04B 14/303; C04B 14/4656; C04B 40/0268; C04B 2235/9615; C04B 2235/96; C04B 2235/61
USPC ............. 428/64.1, 66.4, 66.6, 137, 150, 325, 428/454, 446, 65.9, 66.2; 501/307, 53, 36, 501/95.2, 98.1, 123, 134, 153; 492/50; 51/307; 65/100, 108, 374.13; 264/87, 264/319, 40.5, 603, 636, 652, 681
See application file for complete search history.

(56) References Cited

U.S. PATENT DOCUMENTS 2,917,426 A    12/1959    Bugosh
3,354,031 A    11/1967    Kozacik
(Continued)

FOREIGN PATENT DOCUMENTS

JP    58-156717    9/1983
WO    WO 03/082755    10/2003

OTHER PUBLICATIONS

UNIFRAX Product Information sheet, http://www.fiberfrax.com/ 2006.
(Continued)

*Primary Examiner* — Kevin Bernatz
(74) *Attorney, Agent, or Firm* — Nixon & Vanderhye P.C.

(57) ABSTRACT

The present invention relates to a process for producing a base material for disks of disk rolls, in which the disk roll contains a rotating shaft and a plurality of the disks fitted on the rotating shaft by insertion whereby the outer peripheral surface of the disks serves as a conveying surface, in which the process contains molding a slurry raw material containing inorganic fibers, an inorganic filler having an aspect ratio of from 1 to 25 and an inorganic binder into a plate shape; and drying the molded plate.

3 Claims, 1 Drawing Sheet

(51) Int. Cl.
  *B29C 43/52* (2006.01)
  *B65H 27/00* (2006.01)
  *C04B 28/24* (2006.01)
  *C04B 33/36* (2006.01)
  *C04B 35/117* (2006.01)
  *C04B 35/18* (2006.01)
  *C04B 35/195* (2006.01)
  *C04B 35/22* (2006.01)
  *C04B 35/63* (2006.01)
  *C04B 35/636* (2006.01)
  *C04B 35/80* (2006.01)

(52) U.S. Cl.
  CPC ............. *C04B 35/18* (2013.01); *C04B 35/195* (2013.01); *C04B 35/22* (2013.01); *C04B 35/6303* (2013.01); *C04B 35/6316* (2013.01); *C04B 35/636* (2013.01); *C04B 35/803* (2013.01); *B65H 2401/12* (2013.01); *C04B 2235/3217* (2013.01); *C04B 2235/3481* (2013.01); *C04B 2235/349* (2013.01); *C04B 2235/5224* (2013.01); *C04B 2235/5228* (2013.01); *C04B 2235/5232* (2013.01); *C04B 2235/526* (2013.01); *C04B 2235/5264* (2013.01); *C04B 2235/528* (2013.01); *C04B 2235/5292* (2013.01); *C04B 2235/5296* (2013.01); *C04B 2235/5436* (2013.01); *C04B 2235/5445* (2013.01); *C04B 2235/6027* (2013.01); *C04B 2235/608* (2013.01); *C04B 2235/61* (2013.01); *C04B 2235/96* (2013.01); *C04B 2235/9615* (2013.01)

(56) References Cited

U.S. PATENT DOCUMENTS

| | | | |
|---|---|---|---|
| 3,749,638 | A | 7/1973 | Renaud |
| 4,487,631 | A | 12/1984 | Britt et al. |
| 4,508,777 | A | 4/1985 | Yamamoto et al. |
| 4,533,581 | A * | 8/1985 | Asaumi et al. ............... 428/64.1 |
| 6,896,646 | B2 | 5/2005 | Kaiser et al. |
| 7,284,328 | B2 | 10/2007 | Kaiser |
| 7,507,194 | B2 | 3/2009 | Neubauer et al. |
| 7,781,043 | B2 | 8/2010 | Nakayama et al. |
| 8,691,356 | B2 * | 4/2014 | Watanabe et al. ........... 428/64.1 |
| 2003/0181302 | A1* | 9/2003 | Kaiser et al. .................... 492/40 |
| 2007/0231526 | A1 | 10/2007 | Nakayama et al. |
| 2008/0120995 | A1 | 5/2008 | Neubauer et al. |
| 2009/0041967 | A1 | 2/2009 | Tomosue et al. |
| 2009/0149310 | A1 | 6/2009 | Neubauer et al. |
| 2009/0272151 | A1 | 11/2009 | Lacasse et al. |
| 2010/0113238 | A1 | 5/2010 | Horiuchi et al. |
| 2012/0272686 | A1* | 11/2012 | Horiuchi et al. ................... 65/90 |

OTHER PUBLICATIONS

U.S. Appl. No. 12/612,278.
U.S. Appl. No. 13/067,011.
U.S. Appl. No. 13/067,836.
U.S. Appl. No. 12/801,166.
Official Action in Korean patent application No. 10-2011-0046949 received Nov. 2, 2012.
Handbook of Mineralogy © 2001 page on aluminosilicate (2 pages).

* cited by examiner

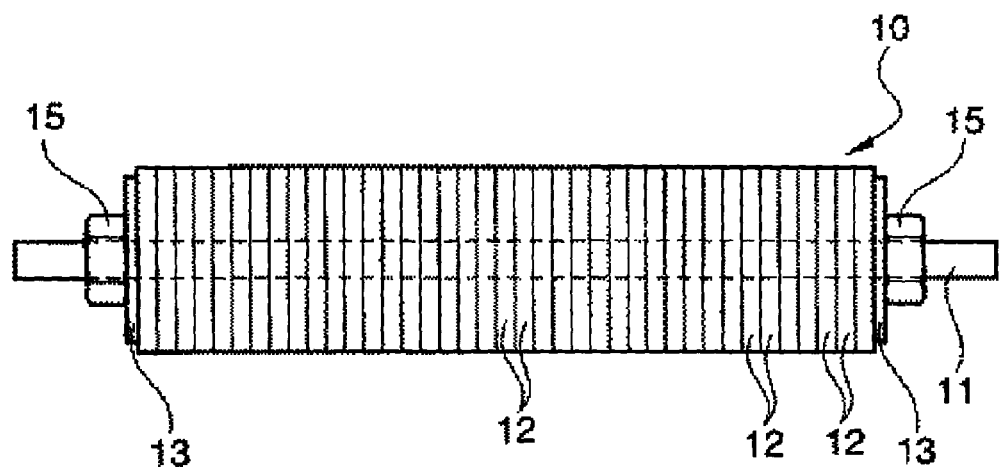

DISK AND PROCESS FOR PRODUCING BASE MATERIAL FOR DISK, AND DISK ROLL

This application is a continuation of U.S. application Ser. No. 13/111,116 filed May 19, 2011, now allowed, which in turn claims priority of Japanese Patent Application No. P.2010-115460 filed May 19, 2010, the entire contents of each of which are hereby incorporated by reference in this application.

TECHNICAL FIELD

The present invention relates to a disk roll containing a rotating shaft and a plurality of ring-shaped disks fitted on the rotating shaft by insertion, and providing a conveying surface formed by outer peripheral surfaces of the disks; a base material for the disk; and a process for producing the base material.

BACKGROUND ART

Disk rolls have been used, for example, to convey a sheet glass flown down from a melting furnace or to convey a heated metal plate such as a stainless steel plate in an annealing furnace (for example, see Patent Document 1). As shown in FIG. 1, the disk roll 10 is one that a plurality of ring-shaped disks 12 containing inorganic fibers or an inorganic filler are fitted on a metal-made shaft 11 as a rotating shaft by insertion to form a roll laminate and the whole roll laminate is pressurized through flanges 13 provided at both ends and fixed by nuts 15 in a state of applying slight compression to the disks 12. Outer peripheral surfaces of the disks 12 function as a conveying surface.

In the disk roll, the shaft 11 on which the disks 12 are fitted by insertion is made of a metal. Therefore, when the disk roll is exposed to high temperature, the shaft 11 thermally expands and elongates along a shaft direction. In this case, there is a concern that because the disk 12 is made of ceramics having a coefficient of thermal expansion lower than that of a metal, the disk 12 cannot follow the elongation of the shaft 11, and thereby the disks 12 may separate with each other, resulting a disk separation (the phenomenon that gap is generated between the disks). Further, there is concern that cracks are generated on the roll surface (conveying surface) caused by thermal stress due to temperature difference (thermal expansion difference) between outside (peripheral surface) and inside (inner portion) of the disk. To avoid those disadvantages, scale-like materials such as mica have been blended to the disk in many cases (for example, see Patent Documents 1 and 2). That is, mica has extremely thin layer structure, and also has a tendency that when heated, it releases crystallization water to cause crystal modification, and expands in a layer direction. It is expected that the follow-up properties to thermal expansion of the shaft material 11 of the disk 12 can be improved by the expansion of mica in a layer direction.

PRIOR ART REFERENCES

Patent Document

Patent Document 1: JP-A-58-156717 (1983)
Patent Document 2: JP-T-2005-520774

SUMMARY OF THE INVENTION

However, when mica is contained in base material for disk as an inorganic filler like the disk roll described in Patent Documents 1 and 2, because mica is a scale-like material, mica may be present in inner portion of base material, for example, in a state that mica is oriented in parallel to the surface of the flat plate base material in a molding step of the base material. As a result, mica may be oriented in parallel to the surface of the disk which is obtained by punched out from the flat plate base material, that is, oriented in vertical to the conveying surface of the disk roll. For this reason, there is a concern that when abrasion of the conveying surface proceeds, edge of mica is exposed on the conveying surface, and thereby linear scratches occur on the surface of a glass plate or metal plate by the edge of mica. Those scratches do not become problem at present. However, with further progress of high quality of a glass plate or metal plate, there is a concern that these scratches give rise to a new problem.

Further, in recent years, an area of a glass plate and metal plate conveyed is increased. As a result, long time is required for conveying per one plate and contact period of the plate with disk becomes long. For this reason, the temperature of the disk becomes higher than that in the conventional process, and there is a tendency that temperature difference in the disk between before and after the conveying, that is, between during contacting with a glass plate or metal plate and completion of the contact, becomes larger than that in the conventional process. Furthermore, at the time of periodic inspections, there is a case that the disk is rapidly cooled too. For this reason, the disk separation and surface crack are easy to occur.

The present invention has been made in view of the above problems, and has an object to provide a disk roll free from the problems that the surface of materials to be conveyed such as a glass plate and a metal plate is scratched, and disk separation and cracks occur when rapidly cooled.

(1) A process for producing a base material for disks of disk rolls in which the disk roll comprises a rotating shaft and a plurality of the disks fitted on the rotating shaft by insertion, whereby the outer peripheral surface of the disks serves as a conveying surface, wherein the process comprises molding a slurry raw material containing inorganic fibers, an inorganic filler having an aspect ratio of from 1 to 25 and an inorganic binder, into a plate shape; and drying the molded plate.

(2) The process for producing a base material for disks according to the above (1), wherein the inorganic filler does not contain a scale-like material.

(3) The process for producing a base material for disks according to the above (1) or (2), wherein the inorganic fibers have a wet volume of 300 ml/5 g or more, and are amorphous or have a degree of crystallinity of 50% or less.

(4) The process for producing a base material for disks according to any one of the above (1) to (3), wherein the slurry raw material is molded into a plate shape by a suction dehydration molding method.

(5) A disk for disk rolls, in which the disk roll comprises a rotating shaft and a plurality of the disks fitted on the rotating shaft by insertion and whereby the outer peripheral surface of the disks serves as a conveying surface, wherein the disk comprises inorganic fibers, an inorganic filler having an aspect ratio of from 1 to 25, and an inorganic binder, and the inorganic filler does not contain a scale-like material.

(6) A disk roll comprising a rotating shaft and a plurality of the disks according to the above (5) fitted on the rotating shaft by insertion.

(7) A disk roll comprising a rotating shaft and a plurality of disks fitted on the rotating shaft by insertion and whereby the outer peripheral surface of the disks serves as a conveying surface, wherein the disk comprises inorganic fibers, an inorganic filler having an aspect ratio of from 1 to 25, and an inorganic binder, and the disk roll has a packing density of the disks of from 0.6 to 1.6 g/cm³.

According to the present invention, because scale-like materials such as mica are not contained in the disk, there is no possibility that the surface of materials to be conveyed is scratched.

Further, even though a scale-like material such as mica is not contained, relatively long inorganic fibers can be remained in the disk after roll build. Therefore, elasticity of the inorganic fibers can be maintained and exhibited. As a result, high restoration ratio of the disk can be maintained, and stress due to thermal expansion difference can be relaxed or absorbed. Therefore, the disk roll having excellent spalling resistance, which does not cause disk separation and cracks even when rapidly cooled, is obtained.

BRIEF DESCRIPTION OF THE DRAWINGS

FIG. 1 is a schematic view showing one example of a disk roll.

MODE FOR CARRYING OUT THE INVENTION

The present invention is described in detail below by reference to the drawing.

Base Material for Disk

The present invention provides a base material for disks, for producing a disk 12 constituting a disk roll 10 as shown in FIG. 1. The base material for disks of the present invention is obtained by molding a slurry raw material containing inorganic fibers, an inorganic filler having an aspect ratio of from 1 to 25, and an inorganic binder into a plate shape, and drying the molded plate. The aspect ratio used herein means a ratio (maximum diameter length/minimum diameter length) of the longest diameter (maximum diameter length) and the shortest diameter (minimum diameter length) in an inorganic powder. When the inorganic powder has completely spherical shape, its aspect ratio is 1, and when the inorganic powder has a needle shape or a fiber shape, its aspect ratio is a ratio between a fiber length and a fiber diameter. In the present invention, the aspect ratio of the inorganic filler contained in the disk is not particularly limited so long as the aspect ratio is within the range of from 1 to 25, but is preferably from 1 to 20, and further preferably from 1 to 15.

It is preferred in the present invention that the inorganic filler does not contain a scale-like material (scale-like mineral) such as mica. The scale-like material is a plate material, and the minimum diameter length is its thickness. In the general mica as used in a disk roll, the ratio (aspect ratio) between a thickness and a maximum diameter length is 40 or more. Because the scale-like material may be oriented in parallel to the surface of the base material in the molding step of the base material for disks, after fabricated in a disk roll, the scale-like material may be oriented in parallel to the surface of the disk, that is, in vertical to the conveying surface of the disk roll. As a result, when abrasion of the conveying surface proceeds, there is a concern that edge of the scale-like material is exposed on the conveying surface, and thereby linear scratches occur on the surface of a glass plate or metal plate by the edge of the scale-like material. In the present specification, the phrase "the inorganic filler does not contain a scale-like material" means that the inorganic filler may contain a scale-like material of 1.0% by weight or less with respect to the solid contents other than water.

It is preferred in the present invention that the disk does not contain an inorganic filler having an aspect ratio exceeding 25. That is, it is preferred that the disk contains only the inorganic filler having an aspect ratio of 25 or less as inorganic fillers.

The inorganic filler can be any material so long as it is a material other than a scale-like material such as mica, and examples of the inorganic filler include granular materials such as alumina, cordierite, fired kaolin, talc, and silica; and acicular materials such as wollastonite and sepiolite. Of those, alumina, fired kaolin and wollastonite are preferred. Those inorganic fillers may be used alone or in combination of two or more thereof. Here, the fired kaolin is obtained by burning kaolin to disperse plasticity thereof, and therefore, it does not have such a function as an inorganic binder described hereinafter.

The inorganic filler can suppress damages on the surface of the material to be conveyed as it is finer. When the inorganic filler is a granular material, it is preferred to use a fine powder having an average particle diameter of 25 µm or less, more preferably 20 µm or less, and further preferably 15 µm or less. When the inorganic filler is an acicular material, it is preferred to use an acicular material having an average diameter of 80 µm or less and an average length of 1,000 µm or less, more preferably an average diameter of 60 µm or less and an average length of 800 µm or less, and further preferably an average diameter of 40 µm or less and an average length of 600 µm or less. That is, in the present invention, when the inorganic filler is a granular material having an aspect ratio of from 1 to less than 5, the inorganic filler can be a granular material having an average particle diameter of from 0.1 to 25 µm, preferably from 0.1 to 20 µm, and further preferably from 0.1 to 15 µm. When the inorganic filler is an acicular material having an aspect ratio of from 5 to 25, the inorganic filler can be an acicular material having an average diameter of from 1 to 80 µm and an average length of from 10 to 1,000 µm, preferably an average diameter of from 1 to 60 µm and an average length of from 10 to 800 µm, and further preferably an average diameter of from 1 to 40 µm and an average length of from 10 to 600 µm.

In the present invention, it is preferred that the inorganic fibers have a wet volume of 300 ml/5 g or more, and the inorganic fibers are amorphous or have a degree of crystallinity of 50% or less. The inorganic fibers having various fiber lengths can be used in blended form, and in the present invention, the fiber length of the inorganic fibers is defined by a wet volume. According to such the inorganic fibers, it can be expected to obtain follow-up properties to a shaft in temperature difference, which the properties have conventionally been assumed by mica.

The wet volume is calculated by the following method.

(1) 5 g of a dried fiber material is weighed with a balance having precision of more than two decimal places.

(2) The fiber material weighed is placed in a 500 g glass beaker.

(3) About 400 cc of distilled water having a temperature of from 20 to 25° C. is placed in the glass beaker of (2), and the mixture is carefully stirred using a stirrer so as not cut the fiber material, thereby dispersing the fiber material in water. This dispersion may be conducted using an ultrasonic cleaning machine.

(4) The contents of the glass beaker of (3) are moved to a 1,000 ml measuring cylinder, and distilled water is added to the measuring cylinder up to 1,000 ml by a scale.

(5) The mouth of the measuring cylinder of (4) is capped with hand or the like, and while taking care not to leak the contents, the measuring cylinder is turned upside down and the contents are stirred. This operation is repeated total 10 times.

(6) After stopping the stirring, the measuring cylinder is allowed to stand under room temperature, and the sedimentation volume of the fibers after passing 30 minutes is visually measured.

(7) The above operation is conducted in three samples, and the average value is used as the measurement value.

The fiber length becomes long as the wet volume is increased. In the present invention, the inorganic fibers having the wet volume of 300 ml/5 g or more, preferably 400 ml/5 g or more, and more preferably 500 ml/5 g or more is used. The upper limit of the wet volume is not particularly limited so long as the effect of the present invention is achieved. The upper limit may be, for example, 2,000 ml/5 g or less, preferably 1,500 ml/5 g or less and more preferably 1,200 ml/5 g or less.

The common inorganic fibers are mixed with an inorganic filler and the like by stirring in water to prepare a slurry. Therefore, the inorganic fibers are cut during stirring and the inorganic fibers in the disk have short fiber length. For this reason, the disk prepared by using the common inorganic fibers has low elasticity, and therefore, it cannot follow-up rapid temperature change and disk separation is generated, or cracks are generated on the disk. On the contrary, the inorganic fibers having the above wet volume used in the present invention are bulky, short fibers, and even though mixed by stirring when preparing a slurry, the inorganic fibers remain with a fiber length longer than that of the inorganic fibers conventionally used, and comparatively long inorganic fibers are compounded in the disk obtained, thereby elasticity of the inorganic fibers can be maintained and exhibited. As a result, stress due to thermal expansion difference can be relaxed or absorbed, and spalling resistance of the disk roll can be improved.

In the present invention, the inorganic fibers are an amorphous material, that is, having a degree of crystallinity of 0%, or have a degree of crystallinity of 50% or less. The inorganic fibers have excellent fiber strength as the degree of crystallinity decreases. Therefore, even though the inorganic fibers are stirred in the slurry or are applied with compression force in the roll build step, the inorganic fibers are difficult to break, and restoring force of the disk can be maintained. As a result, a disk having high strength and high restoring ratio can be obtained. To ensure the effect, the upper limit of the degree of crystallinity of inorganic fibers is preferably 30% or less, more preferably 20% or less, and further preferably 10% or less. The most preferred inorganic fibers are amorphous inorganic fibers.

In the present invention, the degree of crystallinity is measured with X-ray diffraction method. Calibration curve of mullite is prepared using an internal standard method, and the degree of crystallinity is obtained accordingly.

The average fiber diameter of the inorganic fibers is not particularly limited so long as the effect of the present invention is achieved. However, inorganic fibers are preferred to have relatively large diameter in an average fiber diameter of from 3 to 7 μm, and more preferably from 4 to 7 μm. The inorganic fibers having such relatively large diameter have excellent fiber strength. Therefore, even though the inorganic fibers are stirred in the slurry or are applied with compression force in the roll build step, the inorganic fibers are difficult to break, and restoring force of the disk can be maintained. As a result, a disk having high strength and high restoring ratio can be provided.

The composition of the inorganic fibers is not particularly limited so long as the effect of the present invention is achieved. However, it is preferred that the inorganic fibers contain $Al_2O_3$ and $SiO_2$ in the ratio $Al_2O_3:SiO_2$ of from 60:40 to 99:1. The inorganic fibers having such a composition are called alumina fibers or mullite fibers, and have high heat resistance. Therefore, dimensional change by heating of the obtained disk can be suppressed low. In particular, the mullite fibers having $Al_2O_3:SiO_2$ of from 70:30 to 80:20 has excellent balance in heat resistance, fiber strength and cost, and easily maintains long fiber length even passing through a molding step and a roll build step, therefore, such the mullite fibers can preferably be used in the present invention.

In the present invention, the kind of the inorganic binder is not particularly limited so long as it functions as a binder. Examples of the inorganic binder include clays having properties of sintered by heating such as Kibushi clay, bentonite, and refractory clays such as Gairome clay; silica sol; and alumina sol. Of those, Kibushi clay has high binder effect by sintering, contains smaller amount of impurities, and is therefore preferably used.

In the present invention, the blending amounts of the inorganic fibers, the inorganic filler having an aspect ratio of from 1 to 25, and the inorganic binder in the base material for disks, are not particularly limited so long as the expected effect is achieved. The base material for disks may contain from 15 to 70% by mass of the inorganic fibers, from 10 to 60% by mass of the inorganic filler and from 10 to 50% by mass of the inorganic binder. It is more preferred to contain from 25 to 60% by mass of the inorganic fibers, from 15 to 55% by mass of the inorganic filler and from 15 to 45% by mass of the inorganic binder. It is further preferred to contain from 30 to 50% by mass of the inorganic fibers, from 20 to 50% by mass of the inorganic filler and from 20 to 40% by mass of the inorganic binder. Where the amount of the inorganic fibers is less than 15% by mass, there is concerned that elasticity due to the inorganic fibers is not obtained, and therefore the restoring ratio expected as described hereinafter cannot be obtained after roll build step. Where the amount of the inorganic fibers is larger than 70% by mass, there is concerned that it is difficult to uniformly disperse the inorganic fibers in the slurry, and therefore variation of properties of the base material for disks obtained increases or abrasion resistance is deteriorated.

In the present invention, the base material for disk rolls can be produced by molding an aqueous slurry prepared as a mixture of raw materials of the inorganic fibers, the inorganic filler having an aspect ratio of from 1 to 25 and the inorganic binder, into a plate shape, and drying the molded plate.

The composition of the aqueous slurry is not limited. However, the slurry may contain from 15 to 70 parts by mass of the inorganic fibers, from 10 to 60 parts by mass of the inorganic filler and from 10 to 50 parts by mass of the inorganic binder, per 100 parts by mass of the solid contents other than water. It is more preferred to contain from 25 to 60 parts by mass of the inorganic fibers, from 15 to 55 parts by mass of the inorganic filler and from 15 to 45 parts by mass of the inorganic binder. It is further preferred to contain from 30 to 50 parts by mass of the inorganic fibers, from 20 to 50 parts by mass of the inorganic filler and from 20 to 40 parts by mass of the inorganic binder. Where the amount of the inorganic fibers is less than 15 parts by mass, there is concerned that elasticity due to the inorganic fibers is not obtained, and therefore the restoring ratio expected as described hereinafter cannot be obtained after roll build step. Where the amount of the inorganic fibers is larger than 70 parts by mass, there is concerned that it is difficult to uniformly disperse the inorganic fibers in the slurry, and therefore variation of properties of the base material for disks obtained increases and abrasion resistance is deteriorated.

The aqueous slurry can further contain a molding assistant for improving properties such as moldability; and aggregation inhibitor such as montmorillonite powder. An organic material and an inorganic material, that can disappears from the disk 12 by, for example, burning the disk 12 can be used as the molding assistant. As the organic material, there can be used organic fibers such as pulp; and organic binders such as starch, and fibers and particles of a synthetic resin.

The molding assistant and the aggregation inhibitor can be added to the aqueous slurry as necessary. When added, the amount of those is from 1 to 20 parts by mass, preferably from 2 to 15 parts by mass, and further preferably from 3 to 10 parts by mass, per 100 parts by mass of the solid contents other than water.

As the molding method, there can be used a paper-making method, and a suction dehydration molding method in which suction is conducted from one face of a mold such as a wire mesh while supplying a slurry to other face thereof. In the case of molding a slurry containing bulky, short fibers having relatively large length, a size of flocs obtained by aggregating solids in the slurry is easy to be increased, and filtration resistance is tend to be low. Therefore, the suction dehydration molding method is advantageous. However, in the case that the amount of the inorganic fibers is small (for example, 20% by mass or less), the paper-making method can be used. The paper-making method has the merit to be advantageous in costs.

After molding, a base material for disks is obtained by drying the molded plate. The density of the base material for disks is not particularly limited so long as the effect of the present invention is achieved. The density may be from 0.3 to 1.0 g/cm$^3$, more preferably from 0.4 to 0.8 g/cm$^3$, and particularly preferably from 0.45 to 0.7 g/cm$^3$. The reason is that the compression ratio is increased as the bulk density of the disk is low as compared to a packing density of the disk roll formed by the disk, and restoring force of a disk roll is improved. The thickness of the base material for disks is suitably from 2 to 10 mm in the case of the paper-making method, and from 10 to 35 mm in the case of the suction dehydration molding method. Larger thickness of the base material for disks is industrially advantageous because the number of the disks loaded in the shaft is small.

Disk

The present invention further provides a disk obtained by punching out a ring-shaped product from the base material for disks. The disk of the present invention contains the inorganic fibers, the inorganic filler having an aspect ratio of from 1 to 25, and the inorganic binder. Further, it is preferred that the inorganic filler does not contain a scale-like material. According to such a constitution, fine scratches due to a scale-like material such as mica can be avoided from being generated on the surface of a material to be conveyed. Furthermore, when the inorganic fibers are amorphous or have a degree of crystallinity of 50% or less, and have an average fiber diameter of from 3 to 7 μm, and more preferably from 4 to 7 μm, restoration ratio of the disk can be maintained high, as well as follow-up properties to a shaft in temperature difference are maintained and spalling resistance can be additionally improved even though a scale-like material such as mica is not present. Specifically, the restoring ratio of the disk is from 10 to 100%, preferably from 10 to 90%, more preferably from 10 to 80%, further preferably from 20 to 70%, still further preferably from 20 to 60%, and particularly preferably from 20 to 50%. The restoring ratio of the disk is obtained as follows. A disk roll is prepared by roll building a disk having an outer diameter of 130 mm and an inner diameter of 65 mm to a stainless steel-made shaft having a diameter of 65 mm and a length of 1,000 mm in a packing density of 1.25 g/cm$^3$. The obtained disk roll is rotated at a rotating rate of 5 rpm for 150 hours while heating at 900° C., and then cooled to room temperature of 25° C. The length restored when compression force added to the disk is released is divided by the original length.

In the present invention, a disk may be punched out from the plate base material, but a disk-shaped base material (disk) may directly be obtained by suction dehydration molding using a disk-shaped mold.

In the present invention, a disk 12 containing an inorganic material sintered may be obtained by punching out the disk 12 from a base material, and burning the disk, thereby bringing out a bonding force of an inorganic material contained in the disk and additionally causing an organic component to disappear. Such burning can suppress contamination of the surface of a material to be conveyed due to the organic component.

Disk Roll

As shown in FIG. 1, the present invention further provides a disk roll containing a metal-made shaft as a rotating shaft, and a plurality of the disks fitted on the rotating shaft by insertion, in which the disks form a roll-shaped laminate and being fixed in a state that the whole is compressed from both ends. The packing density of the disks, that is, the density in the state compressed from both ends, is not particularly limited so long as the effect of the present invention is achieved. The packing density may be from 0.6 to 1.6 g/cm$^3$, more preferably from 0.7 to 1.5 g/cm$^3$, and particularly preferably from 1.1 to 1.4 g/cm$^3$. When the packing density is within the range, a material to be conveyed is not scratched, and at the same time, surface hardness having good spalling resistance is obtained, thereby properties of the base material obtained in the present invention can be exhibited at a maximum, which is preferred.

In the disk roll of the present invention, the surface hardness (surface hardness of the conveying surface) is not particularly limited so long as the effect of the present invention is achieved. The surface hardness may be from 25 to 65, preferably from 30 to 60, and more preferably from 35 to 55, in Durometer D Hardness. The Durometer D Hardness can be measured by, for example, Durometer D Type durometer (Asker D Type Rubber Durometer, manufactured by Kobunshi Keiki Co., Ltd).

In the present invention, when inorganic fibers having the wet volume and degree of crystallinity satisfying the above-described specific ranges is used, it is preferred that after building up the disks, the disk roll is burned to cause an organic component contained in the disks to disappear. That is, the inorganic fibers having the wet volume and the degree of crystallinity satisfying the above-described specific ranges has too strong repelling force. Therefore, where a molding assistant such as an organic binder disappears before building up by burning, the shape is difficult to be maintained by only a binding force of the inorganic binder.

EXAMPLES

The present invention will be explained below with reference to the following Test Examples, but the present invention should not be construed as being limited to those Examples.

Slurries were prepared by introducing inorganic fibers, an inorganic filler and an inorganic binder as shown in Table 1 in water, and mixing sufficiently the mixture by stirring. The materials used are as follows.

Mullite fibers: Wet volume of 990 ml/5 g, average fiber diameter of 5 μm, degree of crystallinity of 0%, and $Al_2O_3$:$SiO_2$ of 70:30 to 80:20

Aluminosilicate fibers: Wet volume of 20 ml/5 g, average fiber diameter of 2.5 μm, degree of crystallinity of 0%, and $Al_2O_3$:$SiO_2$ of 45:55 to 55:45

Clay A: Kibushi Clay

Clay B: Bentonite

White Mica: M-60, manufactured by Repco Inc., aspect ratio of 50, and average diameter of 105 μm Alumina: A31, manufactured by Nippon Light Metal Co., Ltd., aspect ratio of 1.5, and average particle size of 5 μm Calcined kaolin: SATINTONE W, manufactured by Hayashi-Kasei Co., Ltd., aspect ratio of 1.5, and average particle size of 3 μm Wallastonite A: NYAD-400, manufactured by Hayashi-Kasei Co., Ltd., aspect ratio of 15, average fiber diameter of 8 μm, and average fiber length of 120 μm Wallastonite B: NYAD-G, manufactured by Hayashi-Kasei Co., Ltd., aspect ratio of 15, average fiber diameter of 40 μm, and average fiber length of 600 μm Pulp: HINTON, manufactured by Weigood of Canada Ltd.

Starch: PETROSIZE J, manufactured by Nippon Starch Chemical Co., Ltd.

Each slurry was molded into a plate shape by a suction dehydration molding method or a paper-making method, and the molded plate was dried to prepare a base material for disks. The base materials were evaluated as follows. The results obtained are shown in Table 1.

(1) Dimensional Change by Heating

A test piece was punched out from each base material for disks, and heated at 900° C. for 3 hours. The diameter of the test piece was measured, and the dimensional change by heating (%) in a length direction (radial direction) was obtained using the measurement values before and after heating. In the present invention, the dimensional change by heating is preferably 1% or less, more preferably 0.7% or less, and further preferably 0.5% or less.

(2) Hardness

Ring-shaped disks having an outer diameter of 80 mm were punched out from each base material for disks, and were roll built on a stainless steel-made shaft so as to achieve a width of 100 mm and the desired packing density. After polishing the conveying surface, hardness (Shore D) of the conveying surface was measured. Furthermore, the same measurement was conducted after heating at 900° C. for 24 hours.

(3) Spalling Resistance

Ring-shaped disks having an outer diameter of 60 mm were punched out from each base material for disks, and were roll built on a stainless steel-made shaft so as to achieve a width of 100 mm and the desired packing density. The resulting assemblies were placed in an electric furnace maintained at 900° C. Fifteen hours later, the assemblies were taken out of the electric furnace and rapidly cooled to room temperature of 25° C. The heating/rapid cooling was repeated, and the number of the repetition until disk separation or cracks occur was counted. The case that disk separation and cracks do not practically occur even though the heating/rapid cooling is repeated three times or more can be evaluated as having excellent spalling resistance. It is preferred in the present invention that disk separation and cracks do not occur even though the heating/rapid cooling is repeated 5 times or more, and more preferably 8 times or more.

(4) Load Deformation

Ring-shaped disks having an outer diameter of 80 mm were punched out from each base material for disks, and were roll built on a stainless steel-made shaft so as to achieve a width of 100 mm and the desired packing density. After polishing the conveying surface, load of 1,200N was applied, and the deformation by the load was measured. The same measurement was conducted after heating at 900° C. for 10 hours. When the load deformation is 0.1 mm or more before and after heating at 900° C. for 10 hours, it can be evaluated as being practically no problem. In the present invention, the load deformation is preferably 0.15 mm or more, and more preferably 0.20 mm or more.

(5) Damage of Material to be Conveyed

Ring-shaped disks having an outer diameter of 80 mm were punched out from each base material for disks, and were roll built on a stainless steel-made shaft so as to achieve a width of 100 mm and the desired packing density. After polishing a conveying surface, a stainless steel plate was passed on the roll in a heating furnace at 900° C. The surface of the stainless steel plate after passing on the roll was observed to confirm the presence or the absence of scratches of 50 μm or more.

TABLE 1

| | | | | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|---|---|---|
| Formulation (parts by mass) | Inorganic fibers | Mullite fibers | | 40 | | | 40 | 30 | 40 | 30 | 30 | 40 |
| | | Aluminosilicate fibers | | | 40 | 40 | | | | | | |
| | Inorganic binder | Clay A | | 10 | 10 | 10 | 10 | 20 | 20 | 20 | 10 | 20 |
| | | Clay B | | 10 | 10 | 10 | 10 | 10 | 10 | 10 | 10 | 10 |
| | Inorganic filler | White mica | | 30 | 30 | | | | | | | |
| | | Alumina | | | | 30 | 30 | 30 | 20 | | | |
| | | Calcined kaolin | | | | | | | | 30 | 40 | 20 |
| | | Wallastonite A | | | | | | | | | | |
| | | Wallastonite B | | | | | | | | | | |
| | Molding assistant | Organic fibers | Pulp | 5 | 5 | 5 | 5 | 5 | 5 | 5 | 5 | 5 |
| | | Organic binder | Starch | 5 | 5 | 5 | 5 | 5 | 5 | 5 | 5 | 5 |
| Properties | Disk | Density (g/cm³) | | 0.62 | 0.65 | 0.74 | 0.61 | 0.80 | 0.67 | 0.69 | 0.55 | 0.53 |
| | | Dimensional change by heating (%) | | 0.6 | 0.1 | 0.1 | 0.3 | 0.3 | 0.2 | 0.3 | 0.3 | 0.3 |
| | | Molding method* | | A | B | B | A | A | A | A | A | A |
| | Disk roll | Packing density (g/cm³) | | 1.25 | 1.25 | 1.25 | 1.25 | 1.25 | 1.25 | 1.25 | 1.25 | 1.25 |
| | | Hardness (Shore D) | Before heating | 46 | 48 | 42 | 43 | 43 | 48 | 58 | 58 | 54 |
| | | | After heating | 52 | 55 | 43 | 43 | 47 | 50 | 62 | 64 | 59 |
| | | Load deformation (mm) | Before heating | 0.21 | 0.10 | 0.14 | 0.28 | 0.28 | 0.27 | 0.17 | 0.14 | 0.19 |
| | | | After heating | 0.22 | 0.09 | 0.15 | 0.24 | 0.27 | 0.28 | 0.18 | 0.14 | 0.22 |

TABLE 1-continued

|  |  | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|---|
|  | Spalling resistance evaluation (times) | 11 | 2 | 2 | 9 | 10 | 12 | 8 | 8 | 8 |
|  | Presence or absence of scratches | Presence | Presence | Absence | Absence | Absence | Absence | Absence | Absence | Absence |

*A: Suction dehydration molding, B: Paper-making

TABLE 2

|  |  |  |  | Ex. 8 | Ex. 9 | Ex. 10 | Ex. 11 | Ex. 12 | Ex. 13 | Ex. 14 |
|---|---|---|---|---|---|---|---|---|---|---|
| Formulation (parts by mass) | Inorganic fibers | Mullite fibers |  | 40 | 30 | 30 | 30 | 30 | 40 | 30 |
|  |  | Aluminosilicate fibers |  |  |  |  |  |  |  |  |
|  | Inorganic binder | Clay A |  | 10 | 20 | 30 | 10 | 20 | 10 | 20 |
|  |  | Clay B |  | 10 | 10 | 10 | 10 | 10 | 10 | 10 |
|  | Inorganic filler | White mica |  |  |  |  |  |  |  |  |
|  |  | Alumina |  |  |  |  |  |  |  |  |
|  |  | Calcined kaolin |  |  |  |  |  |  |  | 15 |
|  |  | Wallastonite A |  | 30 | 30 | 20 | 40 |  |  | 15 |
|  |  | Wallastonite B |  |  |  |  |  | 30 | 30 |  |
|  | Molding assistant | Organic fibers | Pulp | 5 | 5 | 5 | 5 | 5 | 5 | 5 |
|  |  | Organic binder | Starch | 5 | 5 | 5 | 5 | 5 | 5 | 5 |
| Properties | Disk | Density (g/cm$^3$) |  | 0.58 | 0.61 | 0.67 | 0.61 | 0.72 | 0.52 | 0.62 |
|  |  | Dimensional change by heating (%) |  | 0.4 | 0.4 | 0.4 | 0.4 | 0.3 | 0.4 | 0.3 |
|  |  | Molding method* |  | A | A | A | A | A | A | A |
|  | Disk roll | Packing density (g/cm$^3$) |  | 1.25 | 1.25 | 1.25 | 1.25 | 1.25 | 1.25 | 1.25 |
|  |  | Hardness (Shore D) | Before heating | 47 | 51 | 53 | 52 | 47 | 46 | 51 |
|  |  |  | After heating | 52 | 55 | 58 | 55 | 51 | 49 | 56 |
|  |  | Load deformation (mm) | Before heating | 0.20 | 0.16 | 0.15 | 0.16 | 0.18 | 0.20 | 0.17 |
|  |  |  | After heating | 0.21 | 0.19 | 0.16 | 0.17 | 0.19 | 0.19 | 0.18 |
|  |  | Spalling resistance evaluation (times) |  | 11 | 9 | 7 | 8 | 8 | 9 | 10 |
|  |  | Presence or absence of scratches |  | Absence | Absence | Absence | Absence | Absence | Absence | Absence |

*A: Suction dehydration molding

As can be seen from the comparison of the Examples with Comparative Examples 1 and 2, when mica is used as the inorganic filler, the surface of the stainless steel plate is scratched, but when the inorganic filler having an aspect ratio of from 1 to 25 other than mica is used, occurrence of scratches on the surface are suppressed.

As can be seen from the comparison of Example 1 with Example 2, when mullite fibers having a wet volume and a degree of crystallinity satisfying the above-described specific ranges is used as the inorganic fibers, a disk roll having excellent heat characteristics such as spalling resistance can be obtained.

While the present invention has been described in detail and with reference to specific embodiments thereof, it will be apparent to one skilled in the art that various changes and modifications can be made therein without departing from the spirit and scope thereof.

This application is based on Japanese Patent Application No. 2010-115460 filed on May 19, 2010, and the contents thereof are incorporated herein by reference.

DESCRIPTION OF REFERENCE NUMERALS AND SIGNS

10: Disk roll
11: Metal-made shaft
12: Disk
13: Flange
15: Nut

What is claimed is:

1. A process for producing a disk roll comprising:
preparing disks,
the disks comprising mullite fibers, an inorganic filler having an aspect ratio of from 1 to 25, and an inorganic binder,
the inorganic filler being wollastonite,
the mullite fibers containing $Al_2O_3$ and $SiO_3$ in a ratio of from 70:30 to 80:20,
the inorganic binder being Kibushi clay and bentonite,
the disks comprising from 30 to 50% by mass of the mullite fibers, from 20 to 50% by mass of the inorganic filler and from 20 to 40% by mass of the inorganic binder, the disks not comprising mica; and
fitting the disks on a rotatable shaft by insertion whereby an outer peripheral surface of the disks serves as a conveying surface.

2. The process according to claim 1, wherein the disk roll has a packing density of the disks of from 0.6 to 1.6 g/cm$^3$.

3. The process according to claim 1, wherein the inorganic binder further comprises one or more selected from refractory clay, silica sol, and alumina sol.

* * * * *